United States Patent

[11] 3,549,868

| [72] | Inventors | Frederic R. Watson;<br>Robert T. Holmes, Westport, Conn. |
|---|---|---|
| [21] | Appl. No. | 559,949 |
| [22] | Filed | June 23, 1966 |
| [45] | Patented | Dec. 22, 1970 |
| [73] | Assignee | Shell Oil Company<br>New York, N.Y.<br>a corporation of Delaware |

[54] FUEL-MILEAGE COMPUTER
7 Claims, 3 Drawing Figs.

[52] U.S. Cl. .................................................. 235/92,
73/114, 235/150.21
[51] Int. Cl. ..................................................... G01m 15/00;
G06c 29/00
[50] Field of Search ........................................ 235/61J,
92, 150.21; 73/113—114

[56] References Cited
UNITED STATES PATENTS
| 2,304,822 | 12/1942 | Harrison et al. .............. | 235/61 |
|---|---|---|---|
| 3,043,508 | 7/1962 | Wright ............................ | 235/151 |

Primary Examiner—Maynard R. Wilbur
Assistant Examiner—Joseph M. Thesz, Jr.
Attorney—J. H. McCarthy ABSTRACT: An apparatus for computing the fuel economy and/or distance traveled per unit of fuel for a motor-driven vehicle and the velocity of the vehicle during the measurements. The apparatus utilizes digital devices to measure fuel flow, distance traveled and time, and computes the desired outputs from these measurements.

INVENTORS:
F. R. WATSON
R. T. HOLMES
BY: *Oswald W. Milmore*
THEIR ATTORNEY

FUEL-MILEAGE COMPUTER

This invention relates to a fuel-mileage computer and more particularly to an apparatus for computing and indicating the fuel economy or distance traveled per unit of fuel of a motor-driven vehicle and the velocity of the vehicle during the fuel consumption measurement. Still more particularly, this invention relates to an electrical apparatus for digitally measuring and continuously indicating the fuel economy, for example, in miles per gallon, and the velocity or speed, for example, in miles per hour, of an automotive vehicle.

In the automotive and related fields, a need often exists for the measurement of the fuel-mileage of a vehicle and the relative speed of velocity of the vehicle at which the measurements are made. Such needs often occur with regard to fuel and lubricant research, automotive development and evaluation, demonstrations, advertising, etc. While instruments and techniques are presently available to perform these measurements, the prior art methods and instruments are usually either very complicated mechanical arrangements, for the most part analog in nature, or very limited in their applicability and utility for continuous or multiple measurements. For example, one known mechanical analog system for indicating fuel mileage produces an indication of the distance traveled each time one or more precisely measured gallons of fuel that is contained separately from the standard equipment fuel tank has been fed to the carburetor. Obviously, with this type of device, it is necessary that the vehicle travel a considerable distance before a reading can be obtained, i.e., from about 10 to 20 miles, thereby requiring a relatively long time between successive tests. Furthermore, the separate fuel tank that constitutes the standard test volume must be refilled for each test run. Obviously, this method of indicating the fuel mileage of an automotive vehicle requires a relatively large amount of time between consecutive measurements in order that direct readings on the instruments be available. Moreover, the prior art methods and apparatuses obviously do not readily lend themselves to rapid measurements under varied conditions, for example, at different velocities or to easily variable quantities of fuel.

The above-mentioned problems and defects of prior art devices have been overcome by applicants' novel invention whereby fuel mileage computations and indications are readily available for preset and variable fractions of a gallon or any other desired basic volumetric unit of fuel and without requiring that preset quantities of fuel be supplied to the vehicle, i.e., the normal fuel supply to the engine is utilized. Briefly, the problems inherent in the prior art devices are overcome by applicants' invention by providing first and second transducer means for measuring respectively the distance traveled by the vehicle and the quantity or volume of fuel supplied to the engine, and for producing respective output pulse train-type signals having the number or frequency of the pulses proportional to the measured condition. The output pulses representing the distance traveled by the vehicle are passed via a gating circuit to a first counting means which has an indicator connected thereto for indicating the number of pulses counted. The output pulses representing the quantity of fuel supplied to the engine are fed to a second counting means which produces a single output pulse each time a predetermined number of input pulses thereto has been counted. The number of pulses required to be counted by the second counting means in order to produce an output pulse is preset according to the volume of fuel, i.e., a fraction or multiple of the basic volumetric unit, which is to be used for making the fuel mileage computation. For example, if 100 output pulses from the transducer measuring the fuel flow represents 1 gallon of fuel and it is decided to measure the fuel mileage for a tenth of a gallon, then the second counting means produces an output pulse each time 10 pulses have been counted. The output pulses from the second counting means are fed to the gating circuit and control the opening and closing thereof, i.e., the gating circuit changes its condition from open to closed and vice versa with each control pulse fed thereto from the second counting means. Accordingly, the gating circuit effectively acts as a divider for the number of pulses proportional to the distance traveled and the indicated count or number of pulses passing through the gating circuit between the opening and closing thereof by sequential input pulses to the gating circuit is a direct indication of the fuel mileage in miles per gallon. Preferably, for ease in construction of the counters and because they are more readily available, the counters utilized are decade counters and the number of pulses per unit of distance traveled and per unit of fuel and the fractions or multiples thereof used in the computations are also powers of 10.

The speed or velocity computation and digital indication according to the invention are provided in a manner similar to that for the fuel mileage. Briefly, this is brought about by providing in the computer a time generator which produces a predetermined number of pulses per unit of time. For example, as with the flow of the fuel flowmeter pulser and the distance pulser, the time generator produces a number of pulses per unit of time which is a power of 10 and in the preferred embodiment produces 10,000 pulses per hour. To produce the desired indication the distance pulses are also passed to a second gating circuit similar to the gating circuit used for the fuel mileage computation and then to a counter and indicator, while the clock or time pulses are fed to a decade counter which produces an output pulse each time a predetermined number of pulses has been counted, the output pulses from the decade counter being utilized to control the opening and closing of the gating circuit.

The invention and the advantages thereof will be more clearly understood from the following detailed description when taken in conjunction with the accompanying drawings wherein.

Figure 1:
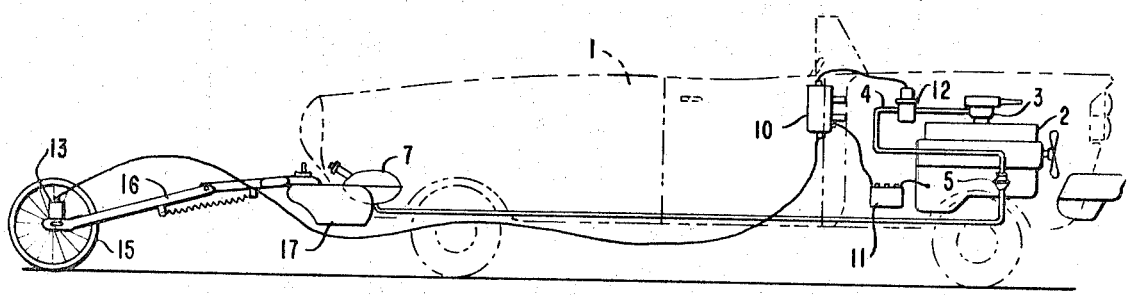
FIG. 1 is a diagrammatical side elevation of an automotive vehicle showing the fuel mileage computer and the apparatus necessary for measuring the distance and fuel incorporated therein.

Referring now to FIG. 1, there is shown an automobile 1 having an engine 2 with a carburetor 3 to which gasoline is supplied in the usual manner via a fuel line 4 from a fuel pump 5 which draws the gasoline from the fuel tank 7. Mounted on the dashboard of the automobile in any convenient manner is the fuel mileage computer 10 according to the invention. As shown in the figure, the power for the computer 10 may be provided from the regular storage battery 11 utilized in the automobile.

In order that the fuel mileage computer 10 will be able to provide the desired computation and indication, it is provided with a pair of inputs for the signals corresponding to the volume of fuel flowing to the engine 2 and the distance traveled by the automotive vehicle. The signal proportional to the quantity of fuel supplied to the engine is provided by a positive displacement flowmeter 12 which is connected in the fuel flow line 4 and by means of a cam-driven electrical switch contained therein produces an output signal in the form of a train of pulses with the number of pulses or frequency thereof being proportional to the measured quantity of fuel flowing through the meter. Preferably, as indicated above, for example, 1 gallon, is a power of 10 and more specifically in the preferred embodiment the flowmeter 12 produces 1,000 electrical pulses per gallon of fuel. A flowmeter operating in this manner and under these conditions is, for example, manufactured by Brooks Instrument Company. The second input signal to the fuel mileage computer 10, i.e., the signal proportional to the distance traveled, is provided by a gear-driven electrical switch 13, which is mounted on a conventional towed "fifth wheel" 15 fastened to the rear of the vehicle 1 in a conventional manner, e.g., by a spring-loaded arm 16 fastened to the bumper 17 of the vehicle. The gear-driven switch 13 is responsive to the rotation of the wheel 15 and provides an output signal in the form of a train of pulses having the number of frequency thereof proportional to the distance traveled. Again, preferably, as with the output signal from the flowmeter 12, the number of pulses representing a unit of distance, e.g., a mile or a kilometer, is a number which is a power of 10 and in the preferred embodiment is equal to 1,000 pulses per mile.

It is also possible to generate a train of pulses proportional to the distance traveled by adapting a commutator switch to the conventional speedometer/odometer drive cable. Since the speedometer drive mechanism of most American automobiles is geared for approximately 1,000 turns per mile, only a simple modification thereof by installing a direct drive commutator switch from the said cable would result in a convenient pulse number to mileage ratio.

Figure 2:
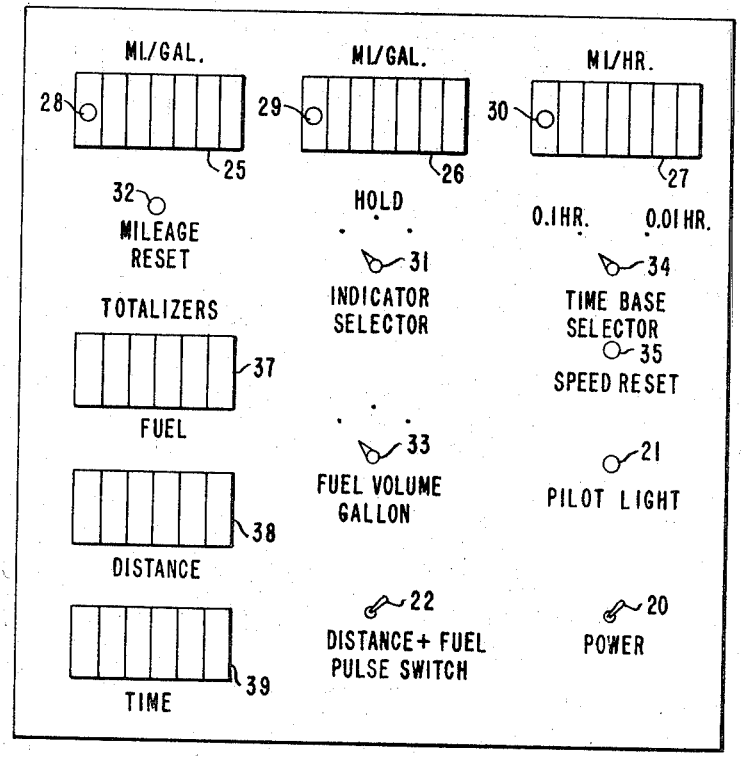
FIG. 2 is a view of the face of the fuel mileage computer of FIG. 1.

Referring now to FIG. 2, there is shown the face or front of the fuel-mileage computer 10. In addition to a main power switch 20 and a pilot light 21 indicating that the power is on, the front of the mileage computer is also provided with a switch 22 for interrupting the flow of distance and fuel volume representing pulses when it is desired to interrupt the measurements or computations for a period of time. Located across the upper portion of the face of the fuel-mileage computer 10 are a plurality of digital indicators 25, 26 and 27, the first two of which produce indications of the distance travel per unit of fuel, i.e., in miles per gallon, and the third of which produces a digital indication of the velocity of the vehicle, for example, in miles per hour. As shown, preferably two indicators 25 and 26 which operate on alternate counting or computing periods are utilized to indicate the mileage or the distance per unit fuel, i.e., miles per gallon, in order to provide for ease in reading the measured value and if desired to provide for comparison between successive tests. So that the operator of the vehicle may easily determine when each of the indicators 25, 26 and 27 is going through a computing cycle, each of the indicators is provided with a pilot light 28, 29 and 30, respectively. A selector switch 31 is provided to enable the operator to select the particular one of the indicators 25 and 26 which is to produce the computed indication. The selector switch 31 is also provided with a center or hold position wherein the indicated values on indicators 25 and 26 may take place, i.e., the indicated counts are effectively locked in the indicators. To permit the operator of the vehicle to reset either of the indicators 25 and 26 to a zero count after a computation has been completed, a mileage reset button 32 is provided which when activated will reset the indicator 25 or 26 not then in use to a zero condition.

The fuel mileage computer 10 is also provided with a second selector switch 33 for selecting the predetermined volume of fuel used in computing the distance per unit of fuel. As indicated in the figure, the switch has three positions corresponding to 0.01, 0.1 and 1 gallon of fuel; and accordingly the computations may be carried out for any of these values. Obviously, if desired, other values for volumes of fuel may be utilized. However, as indicated above, preferably the number of pulses corresponding to 1 gallon is a power of 10, for example, 1,000; and accordingly with the indicated proportions of a gallon which can be selected the indicated count on the counters 25 and 26 is a direct indication of the distance traveled per unit of fuel provided the decimal point is properly located in accordance with the selected position of the selector switch 33.

The fuel mileage computer is also provided with a time delay selector switch 34 for selecting the proportions of an hour for which the speed computations are to take place, and with a speed reset button 35 for resetting the indicator 27.

Also present on the face of the fuel-mileage computer 10 is a plurality of indicators 37, 38 and 39 which indicate respectively the total quantity of fuel, distance traveled and the elapsed time since the beginning of any sequence of tests or measurements. The significance and operation of the various indicators and control switches shown in FIG. 2 will be more clearly understood from the description of the fuel-mileage computer with respect to FIG. 3 below.

Figure 3:
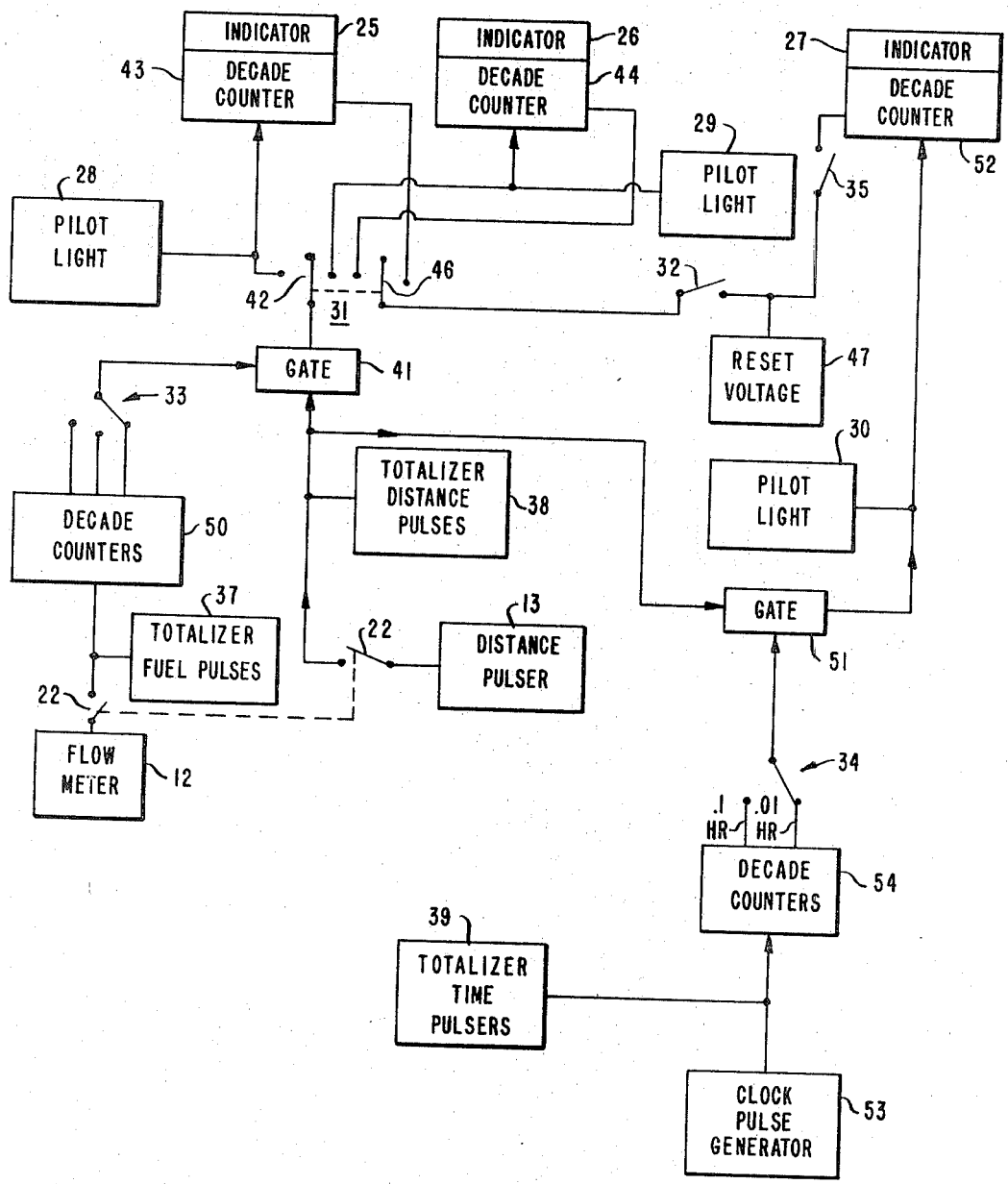
FIG. 3 is a block diagram of the fuel mileage computer according to the invention.

Referring now to FIG. 3, there is shown a block diagram of the fuel-mileage computer wherein blocks representing previously described structures are indicated by like reference numerals. As shown in the figure, after the power has been applied to the computer by closing the switch 20 (FIG. 2) and upon closure of the switch 22, the output pulses from the distance pulser 13 located on the "fifth wheel" 15 are passed to a gate circuit or gating relay 41 such as, for example, a Potter and Brumfield PC11D single coil latching relay, and also to the totalizer 38 for the distance pulses. Any distance pulses passing through the gate 41 during the time it is open are passed, depending on the position of the movable contact 42 of the indicator selector switch 31, to either of the two decade counters 43 and 44 which may, for example, be of the Durant Unipulser type, and which are coupled respectively to the indicators 25 and 26 which may, for example, be series 10, illuminated display indicators manufactured by Electronic Engineers, Inc. and produce indications of the count in the respective counters 43 and 44. As shown in the figure, movement of the movable contact 42 to either the position wherein pulses are directed to the counter 43 or to the position where the pulses are directed to the counter 44 will also cause energization of the respective pilot lights 28 or 29 to show the particular counter which is receiving pulses at that instant. Also associated with the indicator selector switch 31 is a second movable contact 46 which moves in unison with the contact 42 and connects the counter 43 or 44 not then in use to a source of reset voltage 47 via the reset switch 32. With this arrangement, the closing of the reset switch 32 will reset the counter and associated indicator not then in use to a zero value for use during the next measuring or computing period.

As indicated previously, control of the opening and closing of the gate circuit 41 is provided by the output pulses from the flowmeter 12. As shown in the figure, upon closing of the switch 22, the pulses from the flowmeter 12 are fed both to the fuel pulse totalizer 37 and to a decade counter 50. The decade counter 50 may, for example, also be of the Durant Unipulser type and is provided with a plurality of outputs, in the indicated figure, three outputs, which are connected respectively to the highest order digit of the individual decades in the counter; and accordingly an output pulse is present at each of the outputs only when the highest order digit of the particular decade to which it is connected is reached. For example, a pulse will be present on one of the outputs each time 10 pulses are counted, on the second of the outputs each time 100 pulses are counted, and on the third of the outputs whenever 1,000 pulses are counted. The outputs of the decade counter 50 are connected to respective stationary contacts of the fuel volume selector switch 33, the movable contact of which is connected to the control input of the gate circuit 41. Since, as indicated above, the gate circuit 41 changes its condition from open to closed and vice versa each time a pulse is delivered to the control input thereof, by proper positioning of the selector switch 33 the period during which the gate circuit 41 is open or closed may be adjusted in accordance with the desired volume of fuel for which it is desired to make a computation.

In order to explain the operation of the fuel-mileage computer, let it be assumed as mentioned above that the distance pulser produces 1,000 pulses per mile, that the flowmeter produces 1,000 pulses per gallon, and that 0.010 gallons, i.e., 10 fuel pulses, will be used for the computation. Assuming also that the gate 41 is closed, i.e., no pulses are being passed, at the instant the switch 22 is closed, then as soon as the decade counter 50 has received 10 pulses from the flowmeter 12, an output pulse will be generated at the selected output to open the gate 41. At that time pulses from the distance pulser 13 will be passed to the particular one of the counter-indicator combinations 43-25 and 44-26 selected by means of the selector switch 31. When 10 more pulses have been counted by the counter 50, a second output pulse will be generated, thereby opening the gate 41 and stopping the passage of the pulses from the distance pulser 13 to the selected indicator-counter. If it is assumed that 167 distance pulses were accumulated during the 0.010 gallon switching cycle, the distance traveled will be displayed as 0.167 miles or, in other words, 16.7 miles per gallon.

To elaborate on the decimal significance of the number series actually appearing in the indicator it should be noted that a decimal placement between the third and forth integers from the right of indicators 25 and 26 will give a true reading of the distance traveled during the test interim. If a true miles-per-gallon value is the intelligence sought from the indicators 25 and 26, then the placement of the decimal point will depend on the selected position of the fuel volume selector switch 33. When the 0.01 gallons per test interim position is selected, the decimal point is placed between the first and second integer from the right of the indicator. When the 0.10 position of switch 33 is selected the decimal point is placed between the second and third integers. Accordingly, the decimal point is placed between the third and forth integers from the right when the switch 33 selected position is 1.00 gallons per test interim.

It should be noted that at the end of each measuring or computing cycle no computation takes place during the successive period required for the decade counter 50 to produce another output pulse which will then close the gate 41 to allow the passage of distance pulses. Accordingly, the selector switch 31 may be changed during this interval to the remaining counter-indicator combination and then the counter-indicator combination containing the just-computed value reset to zero. It is also noted that although the system has been described requiring manual switching between the two counter-indicator combinations 25-43 and 26-44, obviously a circuit which automatically performs this function may be provided.

The portion of the fuel-mileage computer utilized to compute the speed or velocity of the automotive vehicle operates in a manner similar to that used for computing the fuel mileage, i.e., the distance pulses from the pulser 13 are passed via a controllable gating circuit 51 to a counter 52 to which is connected the indicator 27 for indicating the count in the counter 52. The indicator-counter combination 27-52 may be reset in a manner similar to the previously discussed indicator-counter combinations by means of the reset button 35 which may be closed to reset the counter at any time that the pilot light 30 is not indicating that pulses are passing through the gate 51. In order to control the opening and closing of the gate circuit 51, which, for example, may be a single coil-latching relay similar to that used for the gate 41, the computer 10 is provided with a clock pulse generator 53, or in other words a time-based oscillator, which accurately produces a predetermined number of pulses per unit of time. For example, the clock pulse generator 53 may accurately produce 10,000 pulses per hour. The output pulses from the output generator 53, in addition to being fed to the time totalizer 39, are fed to a decade counter 54 having a plurality of outputs and which produces output signals on the respective outputs in a manner similar to the decade counter 50. As indicated, only two outputs for the time pulses are shown corresponding to one one-hundredth of an hour or 100 pulses, and one-tenth of an hour or 1,000 pulses. Obviously, however, other outputs or rates may be provided. Depending on which of the outputs from the decade counter 54 is selected by the selector switch 34, the gate 51 will be opened and closed by alternate pulses from the counter 54 to allow the distance pulses to pass to the counter 52 to produce an indication of the average velocity over the period for which the gate 51 was closed. For example, if the number of pulses from the pulser 13, delivered at a rate of 1,000 pulses per mile, counted by the counter 52 and indicated by the indicator 27 is equal to 2,000 pulses, and if the selector switch 34 is in the position shown in the figure, i.e., the counting period is 0.1 hours, then the indicated average velocity for the counting period is 20 m.p.h.

For other counting periods, 0.01 hour for example, the decimal must be applied to the integer series displayed by indicator 27 for a true value according to principles applied in the description of indicators 25 and 27.

Obviously, various modifications of the invention are possible in light of the above teachings without departing from the spirit and scope of the invention. It is therefore to be understood that the invention is not limited to the particular form illustrated but is capable of embodiment in other forms within the scope of the appended claims.

We claim:

1. Apparatus for digitally measuring and indicating the fuel consumption of a motor-driven vehicle comprising:
    first transducer means responsive to the distance traveled by the driven wheels of said vehicle for producing a number of electrical output pulses proportional thereto;
    a first electrical pulse counting means;
    a gating circuit for passing the electrical output pulses from said first transducer means to said first electrical pulse counting means when in a first condition and preventing the passage of said electrical output pulses when in a second condition;
    second transducer means for measuring the quantity of fuel supplied to the vehicle engine and supplying a number of electrical output pulses proportional thereto;
    second electrical pulse-counting means for continuously counting said output pulses from said second transducer means, said second electrical pulse-counting means producing an electrical output pulse each time a predetermined number of said output pulses from said second transducer means have been counted;
    means connecting the output of said second electrical pulse counting means to said gating circuit to control the condition thereof, said gating circuit changing condition with each pulse supplied thereto from said second counting means; and
    means for indicating the number of pulses counted by said first electrical pulse-counting means, whereby said indicated count is proportional to the distance traveled per unit of fuel consumed.

2. The apparatus of claim 1 wherein said first and second transducer means each produce a number of pulses per unit distance and fuel respectively which is a power of 10, and wherein said predetermined number of output pulses counted by said second counting means is also a power of 10, whereby said indicated count is a direct indication of the distance traveled per unit fuel consumed.

3. The apparatus of claim 2 wherein said first and second counting means are decade counters.

4. The apparatus of claim 1 including means for resetting said first electrical pulse-counting means to a zero count during the period when said gate circuit is in said second condition.

5. The apparatus of claim 3 including:
    a third electrical pulse-counting means;
    means for indicating the number of pulses counted by said third counting means; and
    switch means connected to the output of said gate circuit for alternately connecting the output of said gate circuit to said first and third electrical pulse-counting means.

6. The apparatus of claim 1 including:
    time pulse-generating means for producing a predetermined number of electrical pulses per unit time;
    a fourth electrical pulse-counting means connected to the output of said time pulse-generating means, said fourth electrical pulse-counting means producing an electrical output pulse whenever a predetermined number of input pulses have been counted;
    a second gating circuit having its input connected to the output of said first transducer means, said second gate circuit passing said input pulses thereto when in a first condition and blocking passage when in a second condition;
    means connecting the output pulses from said fourth electrical pulse-counting means to said second gating circuit to control the condition thereof; and a fifth electrical pulse-counting means and indicating means therefor connected to the output of said second gating circuit whereby the indicated count is proportional to the velocity of the vehicle.

7. The apparatus of claim 6 including means for resetting said fifth electrical pulse-counting means and indicating means therefor during the period said second gating circuit is blocking the passage of input pulses thereto.